(12) United States Patent
Moradmand et al.

(10) Patent No.: US 6,533,085 B2
(45) Date of Patent: Mar. 18, 2003

(54) MODULAR BLOW-OFF VALVE FOR AUTOMOTIVE DAMPER

(75) Inventors: Jamshid Kargar Moradmand, Dayton, OH (US); Robert Alan Neal, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/871,572

(22) Filed: May 31, 2001

(65) Prior Publication Data

US 2002/0179388 A1 Dec. 5, 2002

(51) Int. Cl.[7] ................................................. F16F 9/34
(52) U.S. Cl. ................................................. 188/322.14
(58) Field of Search ........................ 188/322.13, 322.14, 188/322.15, 322.16, 322.22, 282.5, 282.6, 282.8, 282.1, 283, 315–318

(56) References Cited

U.S. PATENT DOCUMENTS 5,251,927 A * 10/1993 Charles et al. ........... 188/282.1
6,230,858 B1 * 5/2001 Moradmand et al. ..... 188/282.6
6,260,678 B1 * 7/2001 Moradmand et al. ....... 188/315

* cited by examiner

*Primary Examiner*—Jack Lavinder
*Assistant Examiner*—C. T. Bartz
(74) *Attorney, Agent, or Firm*—Scott A. McBain

(57) ABSTRACT

A modular blow-off base valve is provided for a vehicle twin tube damper in which a valve body is inserted into the end of an inner damper tube. The valve body has a central opening into which is inserted a valve cage assembly. The valve cage assembly includes a valve cage tubular member having a blow-off valve opening which is pressed into the central opening. A valve stem forming a valve seat with the blow-off valve opening is biased into a closed position by a helical spring seated against the underside of the valve stem at one end and a spring retainer fastened to the bottom of the valve cage at its other end. An annular bleed disc, intake disc and washer disc fit over the tubular member and cover rebound openings in the valve body. When the valve cage assembly is placed into the valve body's central opening, the washer disc biases the intake disc into sealing engagement with the rebound openings in the valve body.

16 Claims, 5 Drawing Sheets

MODULAR BLOW-OFF VALVE FOR AUTOMOTIVE DAMPER

TECHNICAL FIELD

This invention relates generally to fluid dampers for vehicles and more specifically to a blow-off valve assembly.

The invention is specifically applicable to and will be described with particular reference to a blow-off base valve assembly for a twin tube shock absorber. However, those skilled in the art will recognize that the invention may have broader application and conceivably could have application as a piston valve assembly for a twin tube shock absorber or even application to a mono tube shock absorber.

BACKGROUND OF THE INVENTION

The typical fluid dampers used in vehicle suspensions, such as hydraulic shock absorbers and struts, dissipate energy and filter out road inputs from being transferred to the vehicle's body and associated passenger compartment. Two common types of vehicle fluid dampers, each having a cylinder and piston, are monotube and twin tube shock absorbers. The preferred embodiment of this invention is directed to twin tube shock absorbers and struts.

Twin tube fluid dampers have a valve body located at an end of the piston commonly referred to as a piston valve and a valve body located at the end of the cylinder commonly referred to as a compression or base valve, and will herein be referred to as a base valve. The piston valve moves towards the base valve during compression and away from the base valve during rebound. The piston and base valve divide the fluid damper into several chambers. In a twin tube damper the chambers are conventionally referred to as a rebound chamber, a compression chamber and a compensation or reservoir chamber (hereinafter referred to as a reservoir chamber).

Two of the more common types of valves used in fluid dampers are deflected-disc type valves and blow-off type valves. With a deflected disc valve, a disc stack is positioned as an obstruction in a fluid flow path. During piston movement, and once sufficient pressure is developed, the disc stack is deflected to provide an increased flow area. The extent to which the disc stack resists deflection assists in determining the damping characteristics of the fluid damper. With a blow-off valve a single valve disc is generally biased by a spring to normally close-off fluid flow passages. Sufficient fluid pressure causes the valve to lift, compressing the spring and providing an increased fluid flow area. Different rate springs and pre-loads allow the valve to blow-off at different pressures thereby regulating damping loads. This invention relates to blow-off type valves.

Typically, both piston and base valves have compression and rebound valve assemblies generally mounted on opposite valve body surfaces. However, in twin tube dampers, the piston valve is generally considered to primarily control the rebound characteristics of the fluid damper while the base valve is generally considered to primarily control the compression characteristics of the fluid damper.

The ride handling characteristics of a damper for a motor vehicle (load versus velocity performance curve) is determined by the individual characteristics of the piston and base valves. For example, during vehicle cornering maneuvers in which the piston undergoes low speed compression, it is desirable for the vehicle to have stiff ride handling characteristics. Conversely, when the vehicle travels over pot holes at relatively high vehicle speeds in which the piston undergoes high speed compression, it is desirable to have soft ride handling characteristics. Different vehicles require different handling characteristics.

As noted, the base valve is the primary control of damping during compression. Typically, fluid dampers are tuned by changing the valve components. Blow-off base valve components which are changed include not only the spring (pre-compression and spring rate) and valve flow-through area which primarily establishes the "soft" ride handling characteristic of the vehicle but also the orifice slots in the orifice disc which primarily sets the stiffness of the fluid damper for vehicle cornering. Additionally, the rebound components of the blow-off valve may also have to be changed.

Currently, the components are individually assembled onto a valve body which has a castellated end edge configuration for securement in the formed and rounded bottom end of the damper cylinder. Assembling the individual components onto the valve body is time consuming. The assembly process could lead, as in any assembly process, to error such as an inadvertent spring pre-compression force if fastener type arrangements are used to set the pre-compression force. At the same time, the valve assemblies are sophisticated assemblies with what may be viewed as minor structural changes producing substantial changes in valve performance. The potential exists for a component of one valve to be inadvertently assembled into another valve. Additionally, different diameter cylinders require different valve components.

SUMMARY OF THE INVENTION

Accordingly, it is one of the major objectives of the invention to provide a modularized fluid damper blow-off base valve assembly to alleviate the problems noted above.

This object along with other features and advantages of the invention is achieved in a base valve for regulating flow of fluid through a twin tube fluid vehicle damper having inner and outer damper tubes. The base valve includes a valve body having i) a cylindrical outer wall portion sealed to an end of the inner damper tube, ii) a rebound surface adjacent one end of the outer wall portion and a compression surface adjacent the opposite end of the outer wall portion, iii) a central opening therein between the compression and rebound surfaces, and iv) a return opening therein between the compression and rebound surfaces spaced radially outward from the central opening. A low speed compression orifice disc or bleed disc is provided to cover the rebound opening and to regulate low speed control and it has at least one orifice in fluid communication with the rebound opening. A modular valve assembly is seated within and extends through the central opening. The modular blow-off assembly includes a tubular valve cage having a blow-off valve opening extending over a central area of the blow-off assembly for a compression fluid flow therethrough. The modular assembly further includes an annular blow-off valve seat circumscribing the blow-off valve opening and a helical spring biasing the valve seat to close the blow-off opening so that compression flow of fluid may be set at a desired blow-off pressure and rate by simply selecting blow-off valve seats and spring preload and rate which are assembled and contained within the valve cage as a single unit.

In accordance with another aspect of the invention, the modular blow-off assembly includes the tubular valve cage having i) a tubular member seated and extending through the valve body's central opening at an upper end thereof with the tubular member's upper end having the blow-off valve opening therein, ii) a spring retainer adjacent a bottom end of the tubular member extending radially inward, iii) a valve stem having a seat surface adjacent the blow-off opening for sealing and unsealing the blow-off opening and a guide surface extending from the seat surface and iv) the spring positioned between the spring retainer and the seat surface of the valve stem to bias the blow-off valve seat into sealing contact with the blow-off valve opening. Because the valve cage contains the blow-off valve opening within the valve cage, differently sized dampers, i.e., 25–46 mm, having different diameter valve bodies but commonly sized central openings can utilize common valve cages and, depending on vehicle application, identical cage components such as the tubular member or the spring retainer are possible.

In accordance with another feature of the invention, the upper end of the tubular member has a shoulder extending radially outward from the central opening of the valve body. The bleed disc and an intake disc functioning as a check valve are in the shape of a washer and are positioned on the tubular member centered about the blow-off valve opening. A leaf spring is provided in the shape of a washer centered about the tubular member and bent with flats to contact the underside of the shoulder and exert a bias against the intake and bleed discs whereby desired low speed compression bleed damping rates can be obtained by simply interchanging bleed discs with different orifices in the modular blow-off valve assembly and/or desired rebound characteristics can be similarly obtained by interchanging or adding higher leaf spring rates.

In accordance with another aspect of the invention, a method for assembling a base valve having reset fluid flow characteristics into an end of an inner tube of twin tube vehicle damper is provided which includes the steps of:
  a) providing a cylindrical valve body having an annular compression surface at one side thereof and an annular rebound surface on its opposite side with the compression and rebound surfaces extending radially outward and blending into a cylindrical castellated end wall portion and the valve body having at least one generally central opening therethrough and at least one rebound opening extending therethrough spaced radially outward from the central opening;
  b) pressing the cylindrical end wall portion into an end of the inner tube to establish a seal between the inner tube and the valve body;
  c) providing a tubular valve cage having a tubular member with an upper end and a lower end, a spring retainer, a helical spring, and a valve stem with the upper end of the valve cage and the valve stem forming a valve seat therebetween for closing and opening a valve opening formed in the valve cages' upper end;
  d) placing the valve stem into the valve cage followed by the spring with one spring end contacting the stem followed by compressing or predeflecting the spring retainer into a groove formed at a set distance at the lower end of the valve cage to form a modular valve cage assembly; and,
  e) inserting the modular valve cage assembly into the valve body in a sealed manner by press fitting the outer surface of the tubular member into the valve body's central opening whereby a blow-off valve is assembled into the damper.

In accordance with a specific aspect of the inventive assembly aspects of the invention, the assembly process includes the additional steps of:

f) providing a bleed disc having at least one orifice in fluid communication with the rebound opening, at least one intake disc and a leaf spring disc with all of the discs in the shape of washers and each having an inside diameter greater than the outside diameter of the central opening and an outside diameter greater than the radial distance of the rebound opening; and,
  g) prior to step (e), when placing the disc over the tubular member with the leaf spring contacting the underside of the shoulder and completing step (e) by pressing the tubular body into the central opening of the valve body a distance sufficient only to set a predetermined spring biasing force on the intake and orifice discs whereby the rebound characteristics of the valve, specifically the pre-compression spring force, are established, in part, by the assembly of the modular valve assembly.

In general summary, various objects, features and advantages of the invention include one or more or any combination of the following with respect to the base valve of a twin tube vehicle damper:
  i) the expense of the base valve is reduced;
  ii) the installation of the base valve is simplified;
  iii) it is easier to optimize the design of a base valve to meet customer specific damper requirements for various vehicle platforms; and/or,
  iv) it is possible to provide a wider range of damper performance with a common construction than what was heretofore possible.

It should also be noted that while the invention was developed for, and is specifically applied to, the base valve of a twin tube hydraulic damper, it is recognized and therefor a feature or advantage of the invention, that the modular valve concepts disclosed herein can have application to damper valves other than the base valve and, specifically, conceivably could be applied as a piston blow-off valve or a valve used in mono-tube dampers.

Similarly, and again noting that while the modular valve was developed as a twin tube damper based valve which primarily controls compression, the modular valve assembly has conceptual application for digressive rebound valve characteristics in a modular valve assembly for use in any damper valve.

These and other objects, features and advantages of the present invention will become apparent from the following Detailed Description of the Invention taken together with the accompanying drawings.

BRIEF DESCRIPTION OF THE DRAWINGS

The invention may take physical form in certain parts and arrangement of parts, preferred embodiment of which will be described in detail and illustrated in the accompanying drawings which form a part hereof and wherein.

DETAILED DESCRIPTION OF THE INVENTION

Figure 1:
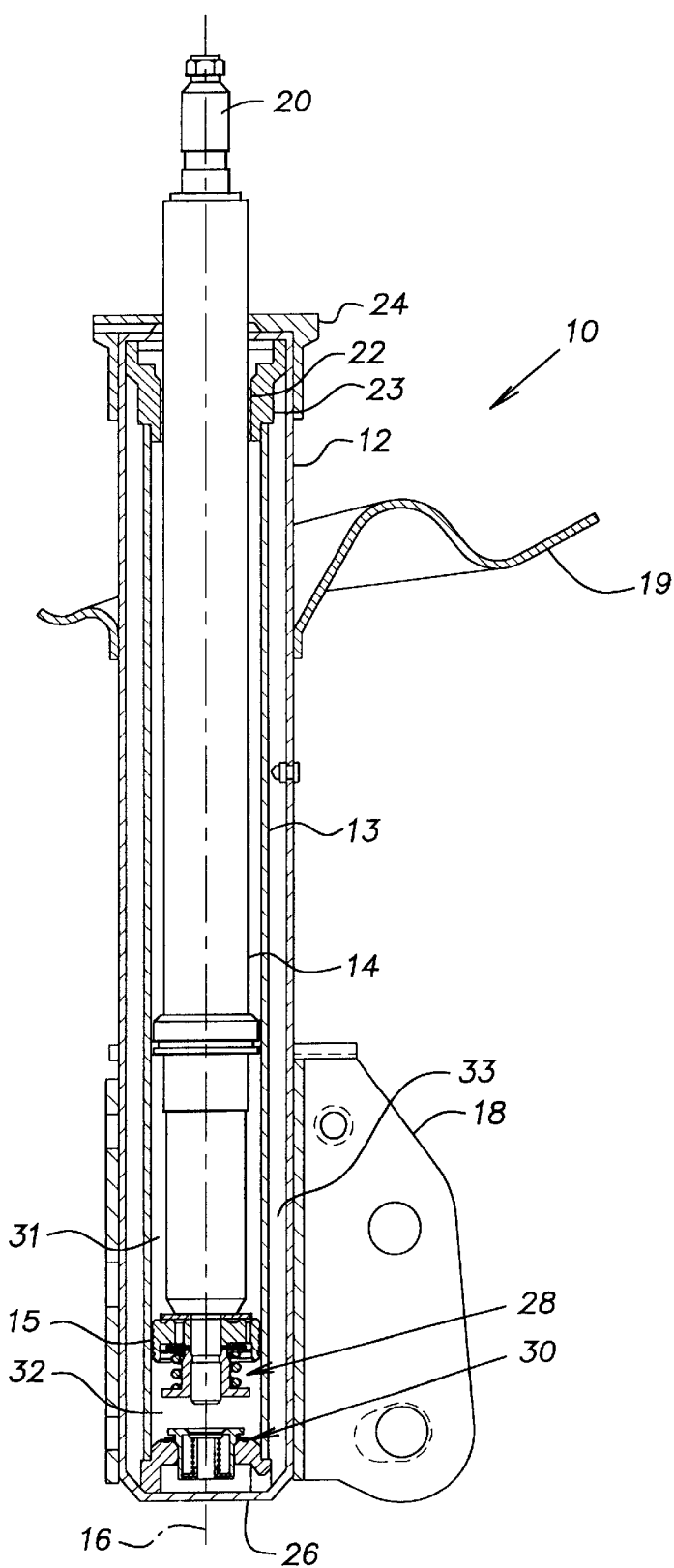
FIG. 1 is a longitudinal, cross-sectional view of a twin tube fluid vehicle damper according to the present invention.

Referring now to the drawings wherein the showings are for the purpose of illustrating a preferred embodiment of the invention only and not for the purpose of limiting the same, there is shown in FIG. 1 a vehicle twin tube fluid damper 10 of the strut type. Damper 10 includes an outer tube 12, an inner tube 13 and a rod 14 with a piston 15 slidingly and sealingly disposed within inner tube 13. Tubes 12, 13 and rod 14 with piston 15 are centered on longitudinally extending axis 16.

Secured to outer tube 12 by any conventional means is a mounting bracket 18 and a spring seat 19 for attachment to the unsprung mass (wheel assembly) of a vehicle. A rod tenon 20 is provided at the end of rod 14 extending out of outer and inner tubes 12, 13 for attachment to the sprung mass (body) of an associated vehicle. This is a conventional arrangement for mounting twin tube dampers of a strut type to a vehicle. Other conventional arrangements can be used for mounting dampers of the "shock absorber" type to a vehicle. The invention is not limited to a mounting arrangement and any mounting arrangement can be used to provide relative movement between piston 15 and tubes 12, 13.

Piston 15 is sealed within inner tube 13 by a piston seal 22 contained within a conventional rod guide 23. A base valve 30 is pressed into the end of the tube 13 and then placed into the outer tube assembly 12. Hydraulic oil is added to the inner tube 13 and the piston rod assembly containing rod 14 and piston 15 is inserted into the inner tube 13. The top is form closed around the rod guide 23 to seal the damper. The bump stop 24 is pressed to the assembly. This assembly is entirely conventional and reference may be had to U.S. Pat. No. 5,620,172 which describes a spinning process to form the top end of outer tube 12. Alternatively, the ends of outer tube 12 can be bent and welded or any other conventional arrangement used to assemble the tubes and piston rod. The bottom end 26 of outer tube 12 is conventionally closed by flame heating and rolling the outer tube walls at the bottom end thereof into either a hemispherical or dome shape or preferably as a flat as shown in FIG. 1. Any conventional manner of forming a closed bottom end 26 of outer tube 12 can be employed.

At the bottom of piston 15 is a conventional piston valve 28. Piston valve 28 illustrated in FIG. 1 is a blow-off type valve. Reference can be had to my U.S. Pat. No. 5,921,360 for a further description of such a valve than that which will be provided herein. At the bottom of inner tube 13 is a base valve 30 which, in the preferred embodiment, is the subject of this invention.

As shown in FIG. 1, base valve 30 is seated between the end of-inner tube 13 and bottom end 26 of outer tube 12. As is well known, piston valve 28 divides the area of inner tube 12 into a rebound chamber 31 extending on one side of piston valve 28 and a compression chamber 32 extending on the opposite side of piston valve 28. Base valve 30 divides damper 10 into compression chamber 32 on one side of base valve 30 (facing piston valve 28) and a compensating or reservoir chamber 33 extending on the opposite side of base valve 30 and including the annular space between inner tube 13 and outer tube 12. Rebound and compression chambers 31, 32 are substantially full of fluid (generally hydraulic) to damp reciprocating movements of piston 15 along longitudinal axis 16. Reservoir chamber is partly filled with fluid (the remainder being air) and acts as a reservoir for the fluid in rebound and compression chambers 31, 32. As noted above, base valve 30 primarily controls the compression characteristics of damper 10 while piston valve 28 primarily controls the rebound characteristics of damper 10. As described thus far, damper 10 is conventional.

Figure 2:
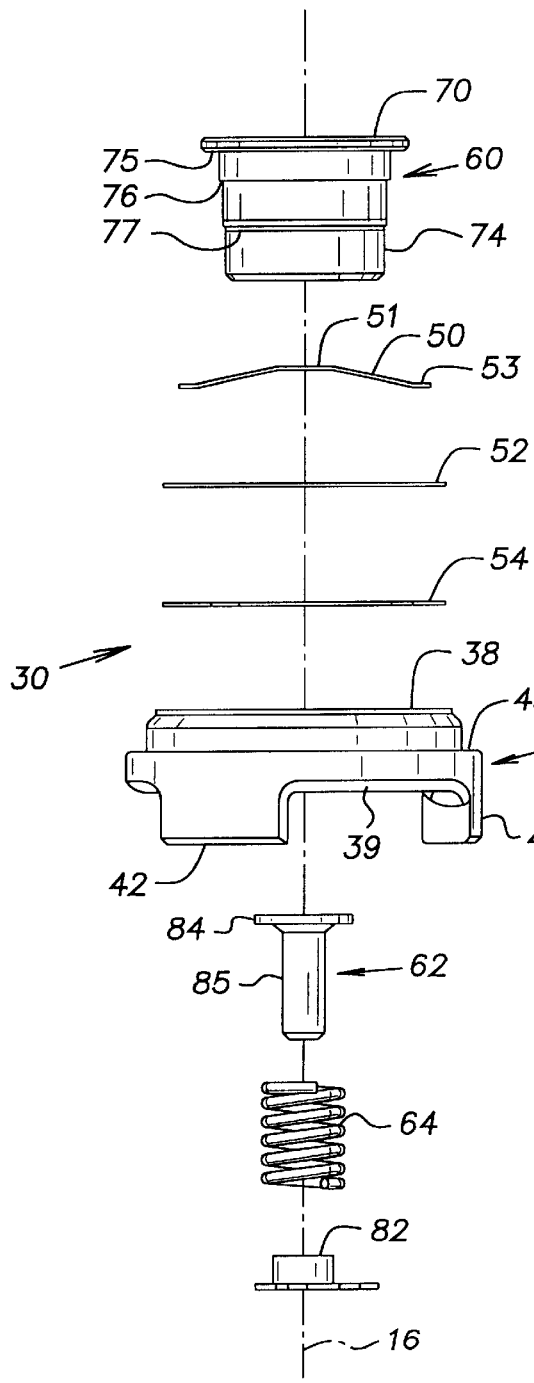
FIG. 2 is an exploded side view of the base valve assembly shown in FIG. 1.
Figure 3:
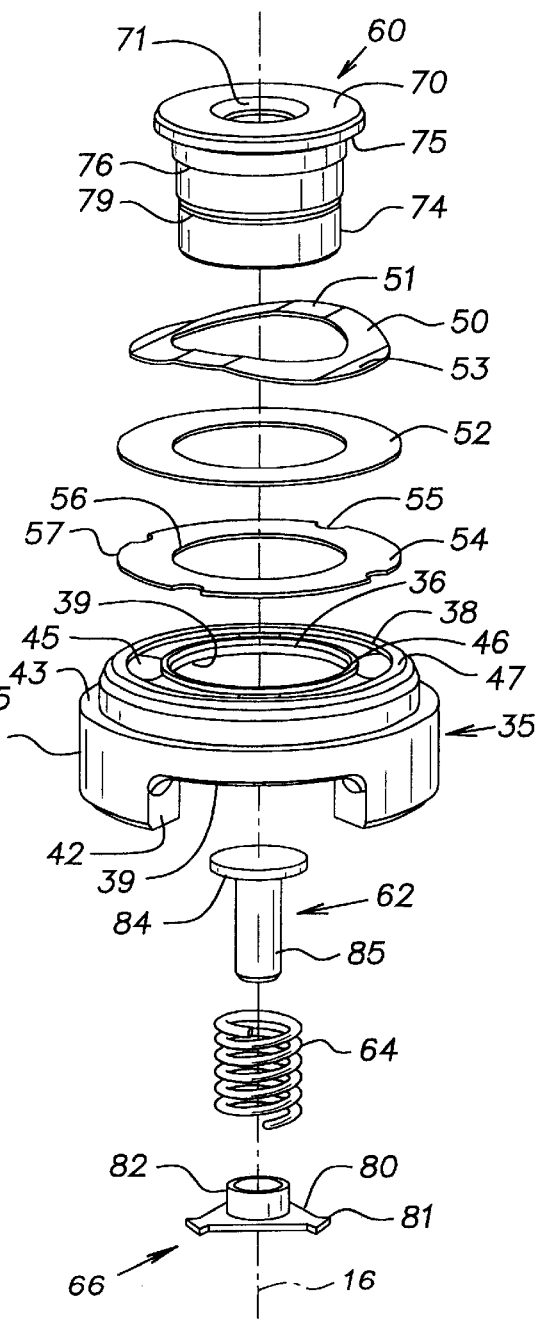
FIG. 3 is an exploded perspective view of the base valve assembly shown in FIG. 2.
Figure 4:
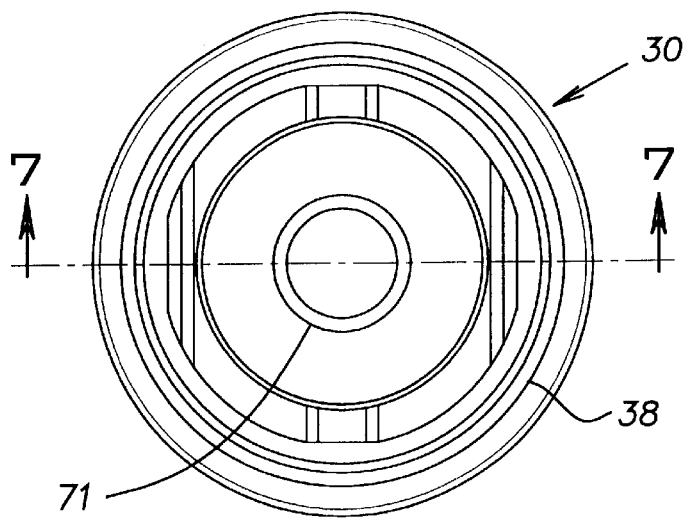
FIG. 4 is a top view of an assembled base valve of the present invention.
Figure 5:
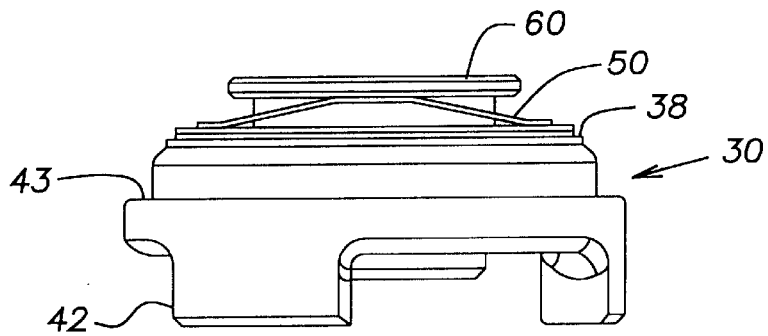
FIG. 5 is a side view of an assembled base valve.
Figure 6:
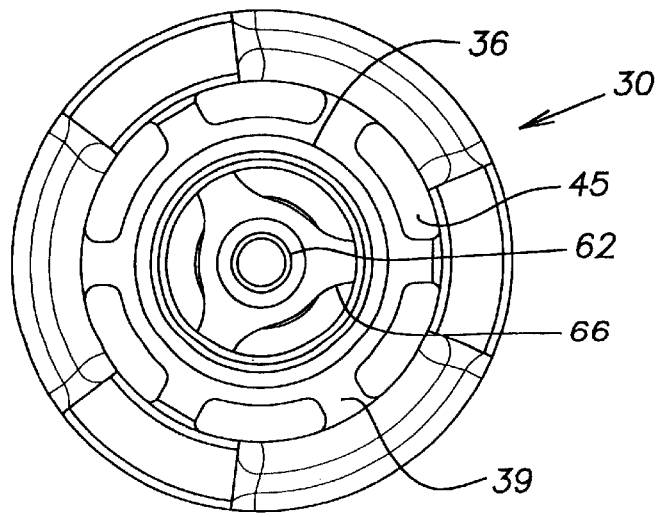
FIG. 6 is a bottom view of the base valve of the present invention.

Referring now to FIG. 2 through 6, base valve 30 includes a cylindrical valve body 35 which has a central opening 36 into which a modular blow-off valve assembly is inserted. Valve body 35 can be viewed as having an annular, rebound surface 38 at its top side adjacent compression chamber 32 extending radially outward from central opening 36. Likewise, an annular compression surface 39 on the opposite bottom side of valve body 35 facing reservoir chamber 33 likewise extends radially outward from central opening 36. Annular compression and rebound surfaces, 38, 39 respectively, extend radially outward and blend into or merge with a castellated cylindrical end wall portion 40 of valve body 35. As best shown in FIGS. 2, 3 and 5, castellated end wall portion 40 includes a plurality of circumferentially spaced downwardly extending spacing lugs 42, the bottom of which contact bottom end 26 of outer tube 13 with the "windows" between adjacent spacing lugs 42 providing fluid communication to the annular space between inner and outer tubes 13, 12 defining a portion of reservoir chamber 33. Castellated end portion 40 also has an annular tube shoulder 43 which seats the bottom edge of inner tube 13 when valve body 35 is pressed into sealing contact with the bottom end of inner tube 13. Spaced radially outward from central opening 36 are a plurality of circumferentially spaced rebound openings 45 extending through valve body 35 from rebound surface 38 to compression surface 39. Rebound openings 45 are positioned or recessed within and circumscribed by an annular inner rebound valve seat 46 and an annular outer rebound valve seat 47.

As best shown in the exploded views of FIGS. 2 and 3, a valve assembly is inserted into central opening 36 of valve body 35. For definition purposes, when the valve assembly is inserted into central opening 36, a completed base valve 30 is produced. The valve assembly is referred to herein as a modular valve assembly and in the preferred embodiment of FIGS. 2 and 3, comprises four loose pieces which can be termed modules. The loose pieces include a specially formed disc shaped washer 50 which functions as a leaf spring; an intake disc 52 which functions as a rebound valve (and in accordance with the broader aspects of the invention, may include several intake discs); a bleed disc 54 having one or more orifice openings 55 functioning as a bleed or by-pass valve and a valve cage, or perhaps more appropriately termed, a valve cage assembly, which is fitted as a unit into central opening 36. The valve cage, in turn, includes as a completed assembly, a valve cage tubular member 60, a valve stem 62, a helical spring 64, and a spring retainer 66. The valve cage assembly functions as a blow-off compression valve. Again, the entire valve assembly is viewed as modular and the valve cage assembly is one module of the valve assembly.

Figure 7:
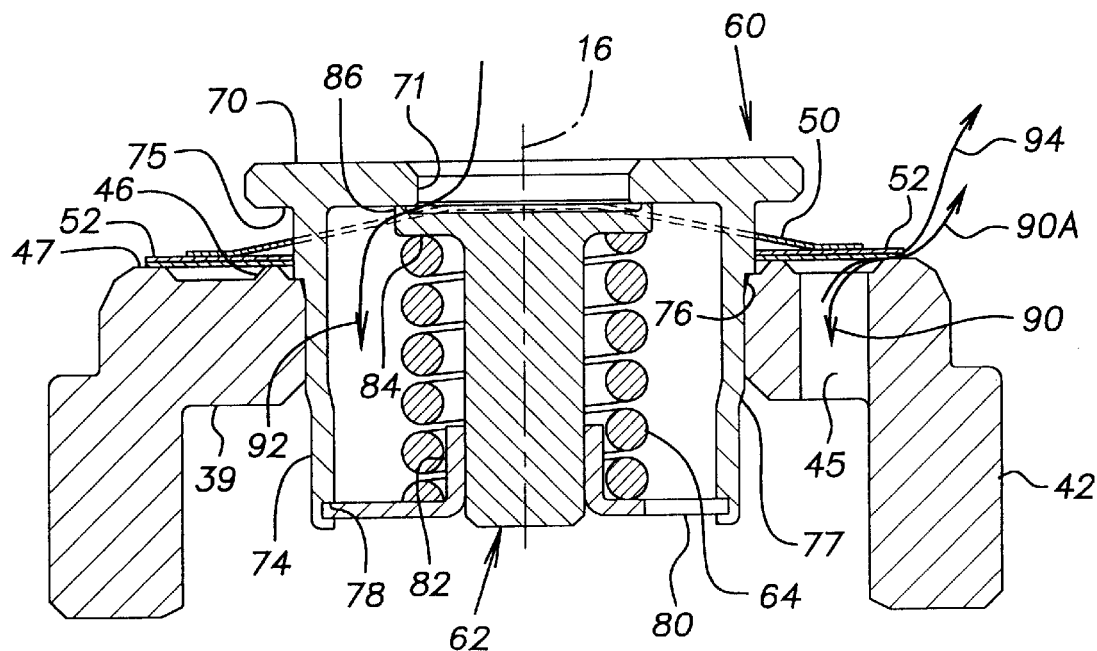
FIG. 7 is a cross-section view of the base valve of the present invention taken along lines 7—7 in FIG. 4.
Figure 8:
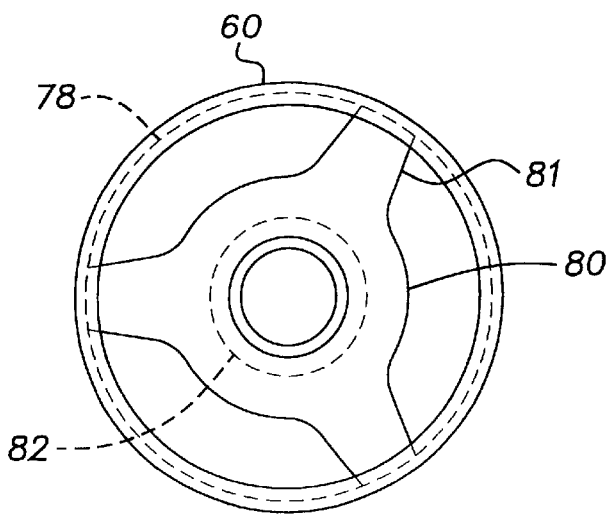
FIG. 8 is a bottom view of the valve cage assembly used in the base valve of the present invention.

As best shown in FIGS. 3 and 7, bleed disk 54 has an inside diameter (I.D.) 56 which is at least equal to, and preferably greater than, the diameter of central openings 36 and an outside diameter (O.D.) 57 which is at least equal to, and preferably slightly greater than, the radial outermost edge of rebound openings 45. In practice, rebound surface 38 is recessed between recessed valve seats 46, 47 as perhaps best shown in the FIG. 3 and extending over or covering the recess are bleed disc 54 and also intake disc 52 and a portion of disc washer 50. As is well known, orifice openings 55 provide fluid communication between compression chamber 32 and reservoir chamber 33 vis-a-vis rebound openings 45. The number and size of orifices 55 are selected as a function of desired vehicle handling characteristics. Positioned on top of bleed disc 54 is the intake disc 52 which, as best shown in FIG. 2, has the same outside diameter as bleed disc 54 and also the same inside diameter. Intake disc 52 functions as a blow-off type rebound valve during rebound of base valve 30. Disc washer 50 is initially in the shape of an annular ring as are bleed disc 54 and intake disc 52 but disc washer 50 in its initial configuration has a slightly larger I.D. and a slightly smaller O.D. than the I.D. and O.D. dimensions of bleed and intake disc 54, 52 which, in the preferred embodiment, are identical. Disc washer 50, which is formed in the preferred embodiment of spring steel (as are intake and bleed disc 52, 54) is bent to have a permanent middle flat 51 and vertically offset, diametrically opposed edge flats 53, as best shown in FIGS. 2 and 3. Specifically, the spring steel of disc washer 50 is bent, pressed or formed to provide middle and edge flats 51, 53, which, as shown, are bent as a curvilinear surface tapering to a flat surface at the edge of disc washer 50 and then may be heat treated by tempering, after forming, to assure resilience of the spring steel. As formed, disc washer 50 can be viewed as a leaf spring having two generally U-shaped spring portions with the legs of each "U" extending from middle flats 51 to the "U" bight portion which comprises an edge flat 53. Disc washer 51, thus, exerts a spring biasing force developed between a spring contact at the top of disc washer 50 on middle flats 51 and a contact at the bottom of disc washer 50 on edge flats 53. The bottom of edge flats 53 contact intake disc 52 which, in turn, contacts bleed disc 54 which, in turn, contacts annular rebound seat surface 46 and annular outer rebound seat surface 47 sealing rebound openings 45. As will be explained below, when the valve cage assembly is inserted into central opening 36, disc washer 50 will be compressed and will exert a preset spring biasing force against intake disc 52 maintaining rebound openings 45 sealed until overcome by fluid pressure.

As noted, the valve cage assembly includes a valve cage tubular member, hereinafter referred to as tubular member 60, which is best shown in FIGS. 2, 3, 7 and 8. Tubular member 60 has a top wall portion 70 through which extends a blow-off valve opening 71. In the preferred embodiment, top wall portion 70 is annular in shape with blow-off valve opening 71 extending over a central area of top wall portion 70. In the preferred embodiment, the center of blow-off valve opening 71 coincides with the center of valve body central opening 36 and lies on longitudinal centerline 16 when base valve 30 is assembled in inner tube 13. Extending downwardly from the underside of top wall portion 70, is a cylindrical, stepped side wall portion 74 of tubular member 60. The intersection of side wall portion 74 with the underside of top wall portion 70 defines an annular collar 75 at the underside of top wall portion 70 which extends radially outward beyond the diametrical distance of central opening 36. The outside diameter of annular collar 75 is greater than the outside diameter of disc washer 50. At a preset longitudinal distance from annular collar 75, tubular member 74 is stepped radially inwardly to form an annular stop surface 76. The cylindrical surface of tubular member 60 established by annular stop surface 76 is dimensionally sized to provide an interference fit with the diameter of central opening 36 in base valve body 35 so that a sealing relationship exists between tubular member 60 and valve body 35 when tubular member 60 is press fitted into central opening 36. Spaced downward from annular stop surface 76 is a bottom, radially inward stepped segment of side wall portion 74 defined by annular bottom strengthening ridge 77. On the inside of side wall portion 74, at some preset longitudinal distance from top wall portion 70, is an annular spring retainer groove 78 (shown in FIGS. 7 and 8).

Inserted within seat groove 78 is spring retainer 66. In the preferred embodiment, spring retainer 66 has a circular base 80 with spokes 81 extending radially outwardly to fit into annular retainer groove 78, there being three such spokes 81 shown for spring retainer 66 in the preferred embodiment. Extending upwardly from circular base 80 of spring retainer 66 is a cylindrical guide stem portion 82.

Valve stem 62 has a top circular seat portion 84 from the bottom of which extends a cylindrical stem portion 85. In the preferred embodiment, an annular blow-off valve seat 86 (FIG. 7) extends from top circular seat portion 84 and contacts the bottom surface of top wall portion 70 of tubular member 60 to normally seal blow-off valve opening 71. Blow-off valve seat 86 thus has a diametrical distance greater than the diametrical distance of blow-off valve opening 71. Alternatively, blow-off valve seat 86 could extend from the bottom surface of top wall portion 70 of tubular member 60 and top circular seat portion 84 of valve stem 62 would be flat. Still further, multiple valve seats, as is known in the art, can be provided.

Helical spring 64 is positioned within the valve cage assembly with its bottom end seated against cylindrical base 80 of spring retainer 66 and its top end seated under circular seat portion 84 of valve stem 62 to bias blow-off valve seat 86 into sealing contact with top wall portion 70 of tubular member 60 and seal blow-off valve opening 71.

In operation during low speed compression, such as a vehicle cornering maneuver, fluid flows from compression chamber 32 to reservoir chamber 33 by passing between the outer edge of intake disc 52 and outer rebound seat surface 47 of valve body 35 in the space provided by orifice openings 55 in bleed disc 54 into rebound openings 45 and then to reservoir chamber 33. This low speed compression by-pass flow of the fluid is indicated by the arrowhead designated by reference numeral 90 in FIG. 7 and a similar path is followed in the reverse direction for low speed, by-pass rebound flow of fluid indicated by arrowhead designated as reference numeral 90A in FIG. 7. During high speed compression, such as occurs when a vehicle travels over a pothole in the road at relatively high vehicle speeds, helical spring 64 is compressed by the high forces of the fluid in blow-off valve opening 71 acting against valve stem 62. The result is an unseating of blow-off valve seat 86 allowing fluid flow under high speed compression to pass from compression chamber 32 into reservoir chamber 33 in the direction of the flow arrow indicated by reference numeral 92 in FIG. 7. During high speed rebound, fluid is displaced from reservoir chamber 33 into compression chamber 32 by exerting a force against disc washer 50 permitting intake disc 52 and bleed disc 54 to unseat from inner and outer rebound seats 46, 47. Rebound flow is indicated by the flow arrow designated by reference numeral 94 shown in FIG. 7 and it should be noted that this flow is still around O.D. of components 50, 52 and 56. Fluid is, of course, traveling between rebound chamber 31 and compression chamber 32 past piston valve 28 in a conventional manner not described further herein.

It should be noted that, conceptually, intake disc 52 (and also bleed disc 54), can bend and be lifted during rebound. Intake disc 52 (and bleed disc 54) is lifted off rebound valve seats 46, 47 and disc washer 50 is functioning as a leaf spring. Because base valve 30 does not primarily control the rebound characteristics of damper 10 (a function primarily controlled by piston valve 28), a thin gauge spring steel washer (approximately 0.20" in thickness) can be formed to produce low spring forces suitable for a base valve application. Conceptually, it is possible to use thicker gauge spring steel formed into an appropriate dimensional relationship to exert higher, preset rebound forces which could function to control the rebound characteristics of the damper as established by piston valve 28 or even function for dual control of compression or rebound in a monotube shock application. As of the date of this application, however, prototypes have not been developed nor tested for such application.

The benefits of the invention are principally realized by the valve cage assembly which is preassembled as a unit for insertion into valve body 35. That is, a valve cage tubular member 60 is selected and a valve stem 62 is inserted into tubular member 60 so that blow-off valve seat 84 contacts the underside of top portion 70 of tubular member 60. Spring 64 is inserted over stem portion 85 of valve stem 62 and spring retainer 66 is inserted so that its guide stem portion 82 fits over stem portion 85 of valve stem 62. A jig or suitable fixture (not shown) slightly spreads the bottom segment of step sidewall portion 74 of tubular member while decompressing spring 64 to snap spokes 81 of spring retainer 66 into retainer groove 78. Next, disc washer 50, intake disc 52, and bleed disc 54, in that order, are inserted over the outside of stepped sidewall portion 74 of tubular member 70 to contact or rest against annular collar 75. The modular valve assembly is then pressed by a suitable jig or fixture (not shown) into central opening 36 of valve body 35 until annular stop surface 76 seats against rebound surface 38 of valve body 35. Base valve 30, as an assembled valve, is then inserted into the bottom of inner tube 13 and inner tube 13 positioned with base valve 30 at its end, into outer tube 12. There is no requirement that the base valve be assembled after valve body 35 has been inserted into the bottom end of inner tube 13.

It is now possible to easily change dimensional valving relationships to achieve desired road handling damper characteristics. In particular, the pre-compression force of helical spring 64 can be readily varied by simply changing the longitudinal position of annular retainer groove 78. Either the longitudinal depth of side wall portion 74 is varied or the position of the groove within sidewall portion 74 is varied. The diameter of retainer base 80 is more than adequate, in the preferred embodiment disclosed, to receive any number of differently sized helical springs 64 as is the diameter of seat portion 84 of valve stem 62. Similarly, the longitudinal distance between annular collar 75 and annular stop surface 76 can be varied to change the preset spring force of disc washer 50 or, alternatively, washer 50 can be formed with preselected offset distances between edge flats 53 and middle flats 51 to set the initial spring biasing force. As already noted, orifice spacing and size within bleed disc 54 can be easily changed to provide desired bypass characteristics. Significantly, it has been observed that the area of central opening 36 and rebound openings 45 established for a valve body 35 for a 32 mm diameter of inner tube 13 is also sufficient for a valve body 35 having an increased diameter sufficient to fit within an inner tube 13 of 34 mm diameter. This means that the basic design of the valve cage assembly and the washer, intake and bleed discs, appropriately modified, can also be used for dampers of different size to provide desired road handling characteristics.

Figure 10:
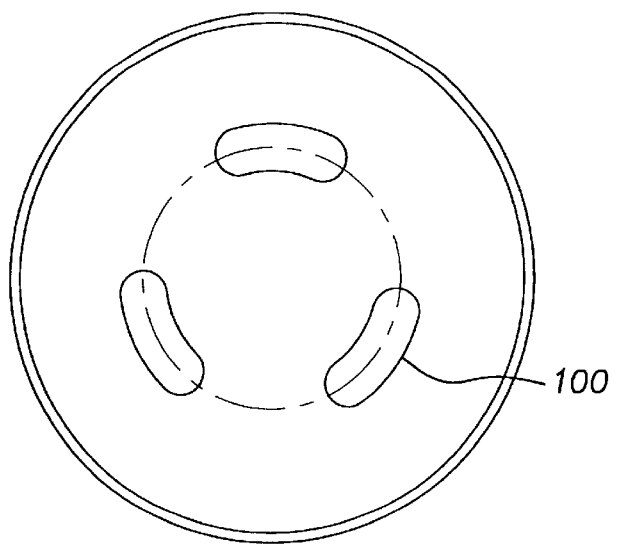
FIG. 10 is a top view of the valve cage assembly of the alternative valve cage embodiment illustrated in FIG. 9; and, FIG. 11 is a bottom view of the alternative valve cage assembly of FIG. 9.
Figure 9:
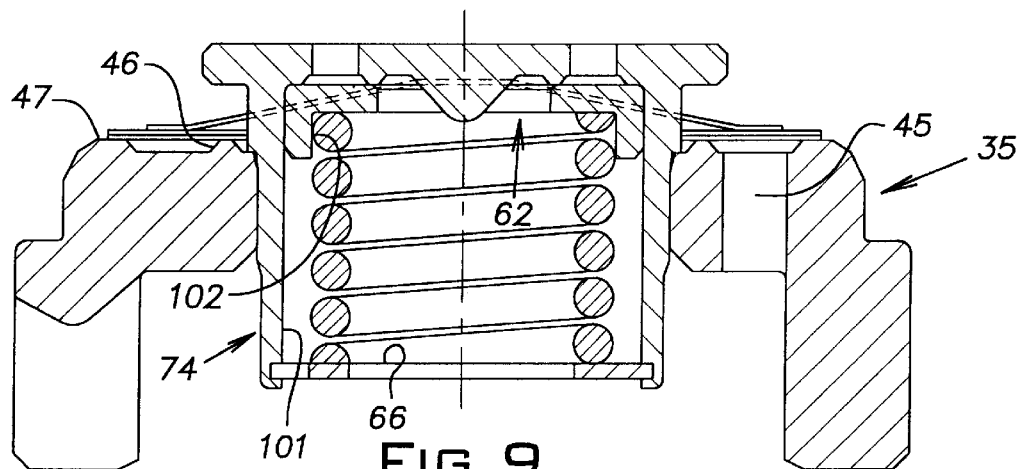
FIG. 9 is a cross-sectional view similar to FIG. 7 of an alternative embodiment of the base valve of the present invention.
Figure 11:
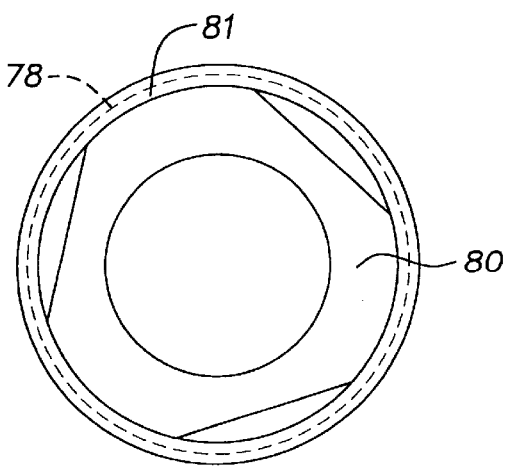

An alternative embodiment is illustrated in FIGS. 9, 10 and 11 and the same reference numerals used when describing the preferred embodiment illustrated in FIGS. 2 through 8 will be used, where possible, in describing the alternative embodiment. The differences between the preferred and the alternative embodiment include the fact that the blow-off valve opening 71 in the preferred embodiment, which was a central opening, now comprise in the preferred embodiment a plurality of circumferentially spaced, kidney shaped valve openings 100. The valve seats for kidney shaped blow-off valve openings 100 are formed in top wall portion 70 and are spaced at circumferential increments about an imaginary circle centered on longitudinal axis 16. Spring retainer 66 retains only the circular base 80 and spokes 81 which fit into retainer groove 78 as in the preferred embodiment. The inner cylindrical surface 101 of step sidewall portions 74 is made of a constant cylindrical I.D. and guide stem portion 82 of the preferred embodiment has been replaced in function by upper spring retaining guides 102, the outer surfaces of which contact cylindrical surface 101 for guiding longitudinal movement of valve stem 62. The operation and assembly of the alternative embodiment of FIGS. 9–11 is identical in all material respects to that described for the preferred embodiment of FIGS. 2–8.

The invention has been described with reference to a preferred and an alternative embodiment. Modifications and alterations of the invention will become apparent to those skilled in the art upon reading and understanding the Detailed Description of the Invention set forth above. It is intended to include all such modifications and alterations insofar as they come within the scope of the present invention.

Having thus defined the invention it is claimed:

1. A base valve for regulating flow of fluid through a twin-tube fluid vehicle damper having inner and outer damper tubes comprising:

a) a valve body having i) a cylindrical outer wall portion sealed to an end of said inner damper tube, ii) a rebound surface adjacent one end of said outer wall portion and a compression surface adjacent the opposite end of said outer wall portion, iii) a central opening therein between said compression and rebound surfaces and, iv) a rebound opening therein between said compression and rebound surfaces spaced radially outward from said central opening;

b) a bleed disc covering said rebound opening and having at least one orifice in fluid communication with said rebound opening; and, c) a modular, unitary blow-off assembly seated within and extending through said central opening, said blow-off assembly including a tubular valve cage having a press fit in said central opening and a blow-off valve opening extending over a central area of said tubular valve cage for compression fluid flow therethrough; an annular blow-off valve seat circumscribing said blow-off valve opening within said tubular valve cage and a helical spring secured to said valve cage biasing the valve seat to close said blow-off valve opening whereby the compression flow of fluid may be set at a desired blow-off pressure and rate by selecting a specific blow-off valve seat and spring assembled and contained within said valve cage.

2. A base valve for regulating flow of fluid through a twin-tube fluid vehicle damper having inner and outer damper tubes comprising:
   a) a valve body having i) a cylindrical outer wall portion sealed to an end of said inner damper tube, ii) a rebound surface adjacent one end of said outer wall portion and a compression surface adjacent the opposite end of said outer wall portion, iii) a central opening therein between said compression and rebound surfaces and, iv) a rebound opening therein between said compression and rebound surfaces spaced radially outward from said central opening;
   b) a bleed disc covering said rebound opening and having at least one orifice in fluid communication with said rebound opening;
   c) a modular blow-off assembly seated within and extending through said central opening, said blow-off assembly including a tubular valve cage having a blow-off valve opening extending over a central area of said blow-off assembly for compression fluid flow therethrough; an annular blow-off valve seat circumscribing said blow-off valve opening and a helical spring biasing the valve seat to close said blow-off valve opening whereby the compression flow of fluid may be set at a desired blow-off pressure and rate by selecting a specific blow-off valve seat and spring assembled and contained within valve cage; and,
   said modular blow-off assembly further includes said tubular valve cage having i) a tubular member seated and extending through said valve body's central opening at an upper end thereof, said tubular member's upper end having said blow-off valve opening therein; ii) a spring retainer adjacent a bottom end of said tubular member extending radially inward, iii) a valve stem having a seat surface adjacent said blow-off opening for sealing and unsealing said blow-off opening and a guide surface extending from said seat surface; and iv) said spring between said spring retainer and said seat surface of said valve stem biasing said blow-off valve seat into sealing contact with said blow-off valve opening.

3. The valve of claim 2 wherein said blow-off valve opening is centered within said central opening of said valve body, said valve seat includes at least one annular seat circumscribing said blow-off valve opening, said spring retainer having a tubular collar formed at its center and said guide surface of said valve stem is a tubular portion of said valve stem extending from said seat surface through said collar of said spring retainer.

4. The valve of claim 2 wherein said blow-off valve opening includes at least one blow-off valve opening radially spaced from the center of said central opening, said valve seat includes at least inner and outer annular seats spanning said blow-off valve opening and said guide surface of said valve stem contacts said side wall of said valve cage.

5. The valve of claim 2 wherein said upper end of said tubular member has a shoulder extending radially outward from said central opening of said valve body;
   said bleed disc in the shape of a washer centered about said tubular member; and,
   a leaf spring in the shape of a washer centered about said tubular member and bent to contact the underside of said shoulder and exert a bias against said bleed disc whereby desired bleed damping rates can be obtained by interchanging discs with different orifices when inserting said valve cage into said central opening.

6. The assembly of claim 5 further including at least one digressive intake disc in the shape of a washer centered about said tubular member on top of said orifice disc and beneath said leaf spring whereby rebound characteristics of said base valve may be altered.

7. The assembly of claim 6 wherein said blow-off valve opening is centered within said central opening of said valve body, said valve seat includes at least one annular seat circumscribing said blow-off valve opening, said spring retainer having a tubular collar formed at its center and said guide surface of said valve stem is a tubular portion of said valve stem extending from said seat surface through said collar of said spring retainer.

8. The assembly of claim 6 wherein said blow-off valve opening includes at least one blow-off valve opening radially spaced from the center of said central opening, said valve seat includes at least inner and outer annular seats spanning said blow-off valve opening and said guide surface of said valve stem contacts said side wall of said valve cage.

9. A method for assembling a base valve having preset fluid flow characteristics into an end of an inner tube of a twin tube vehicle damper comprising the acts of:
   a) providing a cylindrical valve body having an annular compression surface at one side thereof and an annular rebound surface on it opposite side with said compression and rebound surfaces extending radially outward and blending into a cylindrical castellated end wall portion, said valve body having at least one generally central opening therethrough and at least one rebound opening extending therethrough spaced radially outward from said central opening;
   b) pressing said cylindrical castellated end wall portion into an end of the inner tube to establish a seal between said inner tube and said valve body;
   c) providing a tubular valve cage having a tubular member with an upper end and a lower end; a spring retainer; a helical spring and a valve stem, said upper end of said valve cage and said valve stem forming a valve seat therebetween for closing and opening a valve opening formed in said valve cage's upper end;
   d) placing said valve stem into said valve cage followed by said spring with one spring end contacting said stem followed by snapping the spring retainer into a groove formed at a set distance at said lower end of the valve cage to form a modular valve cage assembly; and,
   e) inserting said modular valve cage assembly into said valve body in a sealed manner by press fitting the outer surface of said tubular member into said valve body's central opening.

10. The method of claim 9 wherein said tubular member has a shoulder extending radially outwardly from said central opening and the method additionally includes the acts of:
   f) providing a bleed disc having at least one orifice in fluid communication with said rebound opening, at least one digressive intake disc and a leaf spring disc, all of said discs in the shape of washers each having an inside diameter greater than the outside distance of said central opening and outside diameter greater than the radial distance of said rebound opening; and,
   g) prior to step (e), placing said discs over said tubular member with said leaf spring disc contacting the underside of said shoulder and completing step (e) by pressing the tubular body into said central opening of said valve body a distance sufficient only to set a predetermined spring biasing force on said digressive intake and orifice discs.

11. The method of claim 10 wherein the diameter of said castellated end wall portion may be varied to engage inner tubes of 25 to 46 cm in diameter with common valve cage assembles having identical tubular members.

12. In a vehicular hydraulic fluid damper having a cylinder valve body sealingly disposed at its outer edge within a tube with one side of said valve body facing a varying compression chamber within said tube and the opposite side of said valve body facing a varying rebound chamber within said tube, the improvement comprising:

said valve body having a central opening extending therethrough and a rebound opening space radially outward from said central opening;

a bleed disc having at least one orfice opening in fluid communication with said rebound opening;

at least one intake disc covering said rebound opening;

a modular blow-off valve assembly seated within an extending through said central opening, said blow-off valve assembly including a tubular valve gage having a blow-off valve opening extending over a central area of said valve cage, an annular blow-off valve seat circumscribing said blow-off valve opening and a helical spring biasing said valve seat to close said blow-off valve opening, said valve cage having a shoulder extending radially beyond said central opening in said valve body; and, a spring steel washer with flats at its inside diameter in contact with said shoulder and flats at its outside diameter in contact with said digressive intake disc whereby said washer functions as a leaf spring biasing said digressive intake disc close said rebound opening.

13. The improvement of claim 12 wherein said modular blow-off assembly includes said tubular valve cage having i) a tubular member seated and extending through said valve body's central opening at an upper end thereof, said tubular member's upper end having said blow-off valve opening therein; ii) a spring retainer adjacent a bottom end of said tubular member extending radially inward, iii) a valve stem having a seat surface adjacent said blow-off opening for sealing and unsealing said blow-off opening and a guide surface extending from said seat surface; and iv) said spring between said spring retainer and said seat surface of said valve stem biasing said blow-off valve seat into sealing contact with said blow-off valve opening.

14. The improvement of claim 13 wherein said damper is a twin tube damper and said valve is a base valve.

15. The improvement of claim 14 wherein said blow-off valve opening is centered within said central opening of said valve body, said valve seat includes at least one annular seat circumscribing said blow-off valve opening, said spring retainer having a tubular collar formed at its center and said guide surface of said valve stem is a tubular portion of said valve stem extending from said seat surface through said collar of said spring retainer.

16. The improvement of claim 15 wherein said blow-off valve opening includes at least one blow-off valve opening radially spaced from the center of said central opening, said valve seat includes at least inner and outer annular seats spanning said blow-off valve opening and said guide surface of said valve stem contacts said side wall of a valve cage.

* * * * *